Patented Oct. 20, 1931

1,828,591

UNITED STATES PATENT OFFICE

HENRIK BULL, OF BERGEN, NORWAY

PROCESS OF TREATING FATTY MATERIALS TO OBTAIN FATS OR OILS THEREFROM

No Drawing. Application filed December 8, 1927, Serial No. 238,726, and in Norway December 11, 1926.

This invention has for its object a process of treating fatty materials such as for example whale blubber, fish livers, tallow and other materials for the purpose of promoting separation of the fat (or oil respectively) from the parts of the material containing water.

According to the invention the material is subjected to the action of substances with strongly water binding properties, whereupon the material is subjected to further treatment (for example, pressure treatment, centrifugal treatment etc.) to separate the fat from the other constituents of the mixture.

When fatty materials, such as for example cod livers or whale blubber is to be subjected to the treatment according to the present invention by mixing with water binding substance and subsequent pressure or centrifugal treatment it has been found to be possible to obtain an oil output which is much larger than obtainable by the usual processes.

As water binding substances such materials are to be preferred which are able to combine chemically with the water present, as water of crystallization. Further the added substances should be of such a character as not to have any injurious effect on the fat.

Substances which are suitable for the purpose are for example anhydrous sodium sulphate, desiccated alums for example potash alums, burnt gypsum and anhydrous soda. It is of course an advantage to employ these substances in an entirely anhydrous condition, but this is no necessary condition. Substances of the character referred to will as is known combine with different proportions of water. Thus sodium sulphate for example will take up 125 per cent and burnt gypsum about 26 per cent, but the velocity and power with which the combination takes place will also be different. When for example fresh fishes and the like are to be treated, sodium sulphate is suitable, while in conection with salted fish the desired result can be rapidly attained by the use of gypsum. Also the temperature at which the operation is effected is of importance. It is to be noted for example that sodium sulphate containing 10 molecules of water can not exist at a temperature above about 32° C. while gypsum will stand considerably higher temperatures. Usually it is therefore suitable to mix the material with water binding substance at a somewhat lower temperature. The water binding substance is suitably added in excess quantity and the materials ought to be thoroughly mixed for example in a grinding mill. Usually a uniform and dry mixture will be obtained after few minutes mixing. Owing to the fact that chemical reaction is taking place when water is combined as water of crystallization it is desirable that the fatty material as well as the water binding substance is present in a finely subdivided condition so that the reaction can be effected by thoroughly mixing the materials.

The present process is particularly suitable for the treatment of materials containing cell tissue, but it can be employed with advantage also for other products such as for example milk or other fat bearing emulsions.

In the resulting dry mass the fat is present in such a form that it can be readily separated from the other constituents of the mixture by pressure or centrifugal treatments and other known mechanical processes. When sodium sulphate or other substances soluble in water is employed it can be recovered for repeated use.

When for example finely subdivided fish livers are treated and this material is mixed for example with anhydrous sodium sulphate (in a quantity of for example 25 per cent by weight of the livers) then a proportion of oil can be recovered by pressure treatment without the use of particularly high pressures. The fat may also be recovered by extraction with solvents applied to the residuum after a pressure treatment. This last-named method has the advantage that the oil from fresh livers is obtained in good quantity at the same time as the output of oil is much larger than obtainable by the usual method of boiling the livers with steam. When whale blubber is finely subdivided a considerable proportion of the oil will be separated during this operation, and by mixing the resulting mass with a chemical of the above-mentioned character a product is obtained from which practically the entire quantity of fat can be readily pressed out.

By recovering oil for example from whale blubber by mixing with the anhydrous salt and subsequent pressure treatment it has been found that in commercial operation particularly during the last part of the pressure treatment there will sometimes be pressed out not only oil but also a liquid containing salt. When sodium sulphate is used this liquid will consist of an aqueous solution of the said salt. This phenomenon can be the result of an insufficient proportion of anhydrous salt to bind all water in the form of water of crystallization having been employed, or it may be due to the fact that the duration of the treatment has been insufficient for the formation of the salt containing water of crystallization or also because the temperature has been too high to enable the entire quantity of salt to be converted into the hydrated form. The phenomenon shows that it is not necessary for obtaining separation of oil from the tissue to bring about combination of all water present as water of crystallization, but that it is sufficient when a saturated solution of the salt is being formed.

In the treatment of livers, blubber or other fatty materials of a somewhat rancid character, that is to say materials in which some free fatty acid has been spontaneously formed it has been found that it is sometimes difficult to obtain breaking of the emulsion even by the use of an abundant quantity of sodium sulphate.

It has been found however that in such cases the emulsion can be readily broken by adding a quite small proportion of an alkaline substance such as for example finely subdivided sodium carbonate.

The residuum resulting after separation of the oil by pressure or centrifugal treatment contains the inorganic salt employed, still some oil as well as the remainder of organic (nitrogen bearing) material. This residuum can be utilized in the manner that the salt is dissolved in hot water (for example by boiling with steam or water) whereupon the aqueous solution and fat is pressed out and the resulting solids further treated to produce animal food.

Claims.

1. Process for the manufacture of oils from fish livers and blubber of sea animals, comprising the steps of producing an intimate mixture of the oil bearing material in a finely disintegrated condition and a considerable proportion of a solid salt readily soluble in water and able to combine chemically with water, the proportion of solid waterbinding salt being at least sufficient to produce with the water of the oil bearing material a saturated solution, and subjecting the said intimate mixture of oil bearing material and salt to centrifugal treatment to separate the liquid matter of said mixture, the said liquid matter comprising oil, from the solid residuum containing the cell tissue of the treated oil bearing material.

2. Process for the manufacture of oils from fish livers and blubber of sea animals, comprising the steps of producing an intimate mixture of the oil bearing material in a finely disintegrated condition and a considerable proportion of a solid salt readily soluble in water and able to combine chemically with water, the proportion of solid waterbinding salt being at least sufficient to produce with the water of the oil bearing material a saturated solution but insufficient to bind the entire quantity of water in said material as water of crystallization, and subjecting the said intimate mixture of oil bearing material and salt to centrifugal treatment to separate the liquid matter of said mixture, comprising oil, from the solid residuum containing the cell tissue of the treated oil bearing material.

3. Process of manufacturing oil from fish livers and blubber of sea animals, comprising the steps of intimately mixing the oil bearing material in an uncooked and unfermented condition with anhydrous sodium sulphate in a quantity which is not less than required to produce with the water of the oil bearing material a saturated solution of sodium sulphate, and thereupon separating by mechanical means the liquid constituents of the mixture, comprising the oil, from the solid residuum comprising the cell tissue of the treated material.

In testimony whereof I have signed my name to this specification.

HENRIK BULL.